UNITED STATES PATENT OFFICE.

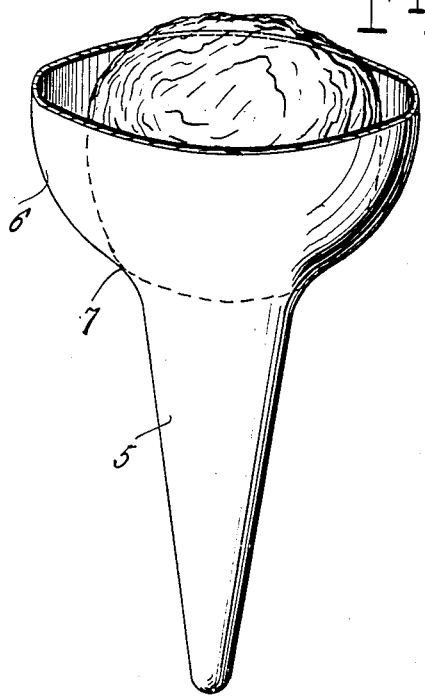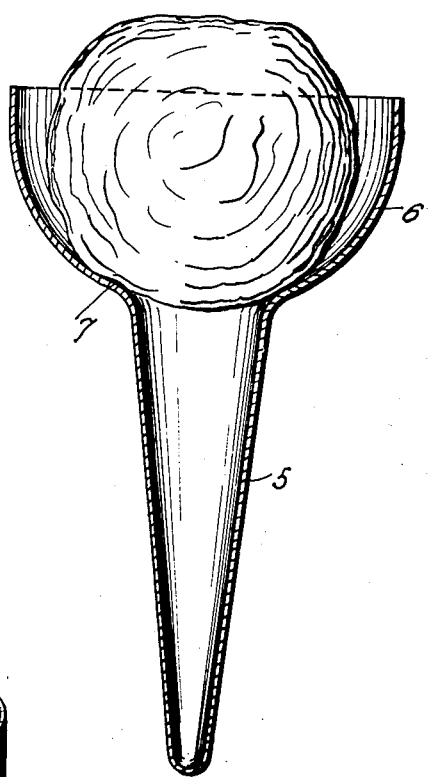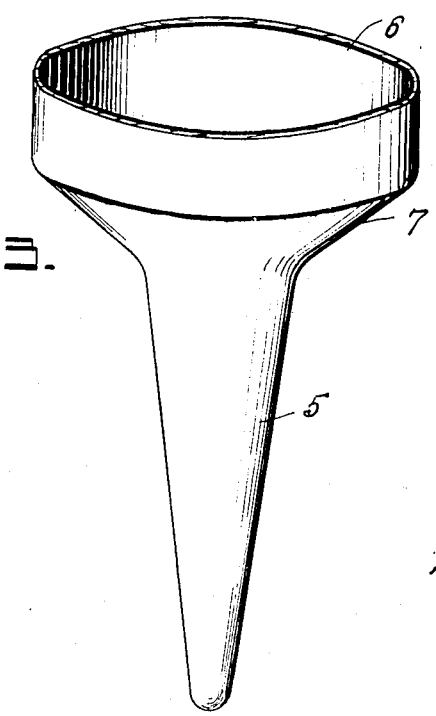

RALPH J. WINNIE, OF CHICAGO, ILLINOIS.

FOOD-RECEPTACLE.

1,367,848.　　　　Specification of Letters Patent.　　Patented Feb. 8, 1921.

Application filed November 3, 1919. Serial No. 335,385.

*To all whom it may concern:*

Be it known that I, RALPH J. WINNIE, a citizen of the United States, residing at Chicago, in the county of Cook and State of Illinois, have invented new and useful Improvements in Food-Receptacles, of which the following is a specification.

This invention relates to food receptacles which are composed of a baked or otherwise prepared edible material, and more particularly a cone-shaped device to hold ice-cream and popularly known as "ice-cream cones."

The invention has for its object to provide a receptacle of the kind stated which is constructed to permit the addition of flavoring syrups, crushed fruits and the like after the ice cream has been deposited in the receptacle, without such flavoring syrups, etc., running down on the outside of the receptacle.

The object stated is attained by a structure to be hereinafter described in detail, and in order that the same may be better understood, reference is had to the accompanying drawing forming a part of this specification.

In the drawing,

Figure 1 is a perspective view of the device;

Fig. 2 is a vertical cross-section thereof, and

Fig. 3 is a perspective view showing a modification.

Referring specifically to the drawing; the device is a goblet-shaped receptacle composed of a baked or otherwise prepared edible material. By this shape, the receptacle is given a stem portion 5 and a bowl 6, the latter being an integral enlargement or bell-shaped flare of the former at the top thereof. The stem has a downward taper and it is hollow, and the bowl opens thereinto. The stem is closed at its lower end.

The enlargement of the tapered or cone like stem 5 forming the bowl or flare 6 produces a shoulder 7 at the junction of these parts, and hence when a lump of ice-cream is placed in the bowl, it rests on the shoulder as clearly shown in Fig. 2. By placing in the bowl a lump of ice-cream of such size that the bowl will not be completely filled, a flavoring syrup can be poured over the lump without running over the edge of the bowl and down along the outside thereof. It will also be noted that the lump of ice-cream closes the stem at the top thereof, and hence the syrup cannot run down into the interior thereof off the ice cream.

The bowl or flare 6 can be given various shapes. In Figs. 1 and 2 is shown bell shaped, whereas Fig. 3 shows a slightly different shape, the portion which joins the bowl to the stem being flat to produce a flat seat for the lump of ice cream.

I claim:

An edible receptacle for food of the nature of an ice cream cone, comprising a bowl-like portion and a depending hollow cone hand portion, the bowl portion being of a capacity to hold the customary service of ice cream.

In testimony whereof I affix my signature.

RALPH J. WINNIE.